US012717568B1

(12) United States Patent
Mounzih et al.

(10) Patent No.: US 12,717,568 B1
(45) Date of Patent: Aug. 25, 2026

(54) MANAGEMENT OF EFFECTIVE ACCESS DATA DIFFERENTIAL UPDATE

(71) Applicant: Rapid7, Inc., Boston, MA (US)

(72) Inventors: Nadia Mounzih, Washington, DC (US); Joseph Buell, St. Louis, MO (US); Val Komarov, Fairfax, VA (US)

(73) Assignee: Rapid7, Inc., Boston, MA (US)

( * ) Notice: Subject to any disclaimer, the term of this patent is extended or adjusted under 35 U.S.C. 154(b) by 96 days.

(21) Appl. No.: 18/135,870

(22) Filed: Apr. 18, 2023

(51) Int. Cl.
*G06F 9/445* (2018.01)
*G06F 8/65* (2018.01)
*H04L 9/40* (2022.01)
*H04L 41/0894* (2022.01)

(52) U.S. Cl.
CPC ............ *G06F 8/65* (2013.01); *H04L 41/0894* (2022.05); *H04L 63/20* (2013.01)

(58) Field of Classification Search
None
See application file for complete search history.

(56) References Cited

U.S. PATENT DOCUMENTS 7,293,169 B1 * 11/2007 Righi ...................... G06F 8/656 717/171
8,990,850 B2 3/2015 Kruger et al.
9,912,702 B2 3/2018 Betzler et al.
10,026,045 B1 * 7/2018 Portnoy ................. G06Q 10/06
10,326,765 B2 6/2019 Hadar et al.
10,728,252 B2 7/2020 Desai et al.
10,861,126 B1 * 12/2020 Sharma ................. G06F 9/4881
11,044,533 B1 * 6/2021 Li ...................... H04N 21/6473
2002/0095497 A1 * 7/2002 Satagopan .......... H04L 63/0884 709/225
2009/0138477 A1 * 5/2009 Piira ....................... H04L 67/34
2010/0186020 A1 * 7/2010 Maddhirala ........... G06F 9/5072 718/105
2011/0196539 A1 * 8/2011 Nair ................. G05B 19/41865 700/9
2015/0277976 A1 * 10/2015 De ........................ G06F 9/4843 718/101
2016/0139952 A1 * 5/2016 Geng .................... G06F 9/5072 718/103
2016/0299750 A1 * 10/2016 Koniges ............... G06Q 50/184
2019/0327271 A1 * 10/2019 Saxena ..................... G06F 8/38
2021/0036912 A1 * 2/2021 Madappa ............ H04L 41/0893
2021/0165694 A1 * 6/2021 Nabi ................... G06F 11/1433
2021/0191714 A1 * 6/2021 Ullman .................. B60K 37/00

* cited by examiner

*Primary Examiner* — Lanny N Ung
(74) *Attorney, Agent, or Firm* — Ashwin Anand

(57) ABSTRACT

An access policy analysis system is disclosed, configured to analyze access policies defined in a computer network to generate effective access data (EAD) for individual pairs of principals and resources in the network, and performing a differential update process to selectively refresh portions of the EAD that are affected by later changes of the access policies. In embodiments, the update process also updates the EAD for principals and resources that exceed a staleness limit (e.g. principals and resources that have not been updated for a specified period of time). The update process is managed via a management interface that allows users to view, control, and configure the update process, and examine various metrics data associated with the update process.

20 Claims, 10 Drawing Sheets

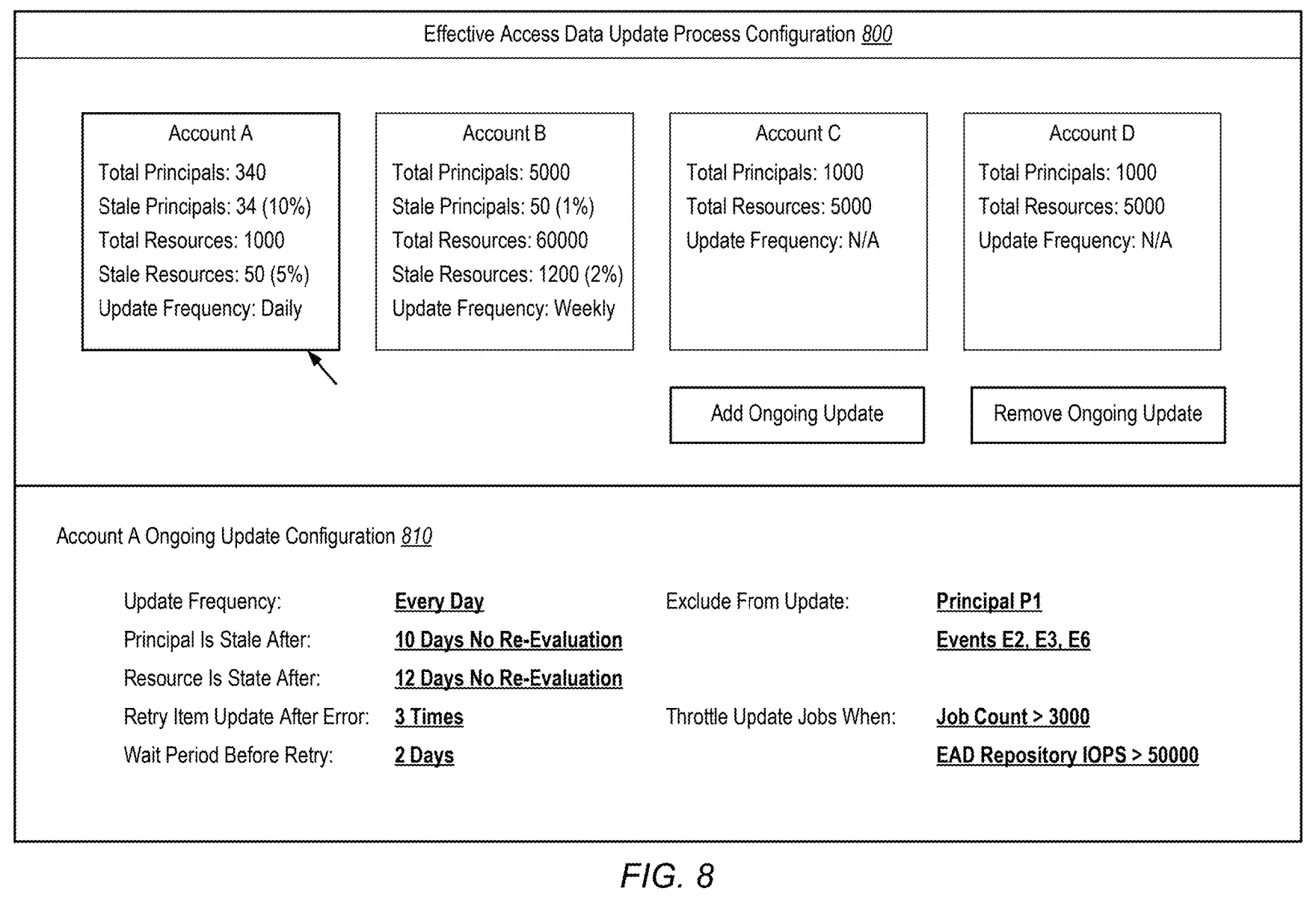

Effective Access Data Update Process Configuration 800

Account A
Total Principals: 340
Stale Principals: 34 (10%)
Total Resources: 1000
Stale Resources: 50 (5%)
Update Frequency: Daily Account B
Total Principals: 5000
Stale Principals: 50 (1%)
Total Resources: 60000
Stale Resources: 1200 (2%)
Update Frequency: Weekly Account C
Total Principals: 1000
Total Resources: 5000
Update Frequency: N/A Account D
Total Principals: 1000
Total Resources: 5000
Update Frequency: N/A Add Ongoing Update Remove Ongoing Update Account A Ongoing Update Configuration 810

Update Frequency: Every Day
Principal Is Stale After: 10 Days No Re-Evaluation
Resource Is State After: 12 Days No Re-Evaluation
Retry Item Update After Error: 3 Times
Wait Period Before Retry: 2 Days

Exclude From Update: Principal P1
Events E2, E3, E6

Throttle Update Jobs When: Job Count > 3000
EAD Repository IOPS > 50000

FIG. 8

MANAGEMENT OF EFFECTIVE ACCESS DATA DIFFERENTIAL UPDATE

BACKGROUND

Cloud service providers offer opportunities to develop and host many different systems, services, or applications without imposing various infrastructure and other management responsibilities on customers. Because cloud service providers can host large numbers of systems, services, or applications, and the implementations of these different systems, services, or application is often distributed across many different resources, there are security and other operational risks when allowing different developers, users, or other entities access to the various resources hosted in a provider network. To mitigate these risks, cloud service providers have implemented access control systems, such as identity and access management (IAM) systems, which allow customers of the cloud service providers to specify access controls for various entities with respect to resources hosted by the cloud service providers.

SUMMARY OF EMBODIMENTS

The systems and methods described herein may be employed in various combinations and in embodiments to implement an access policy analysis system that analyzes access policies in a computer network to perform differential updates for effective access data (EAD) for individual pairs of principals and resources in the network. The update process may be performed periodically to refresh selected portions of the EAD that are affected by changes of the access policies. In some embodiments, the update process also updates the EAD for principals and resources that exceed a staleness limit (e.g. principals and resources that have not been updated for a specified period of time). In some embodiments, the update process is managed via a management interface that allows users to view, control, and configure the update process, and examine various metrics data associated with the update process. Advantageously, the differential update process only executes on those portions of the EAD that are affected by detected access policy changes, so that the EAD can be kept up to date by a relatively lightweight update process without using a large amount of computing resources.

BRIEF DESCRIPTION OF THE DRAWINGS

FIG. 8 depicts a user interface for configuring a differential update process to be performed by the access policy analysis service, according to some embodiments.

Figure 1:
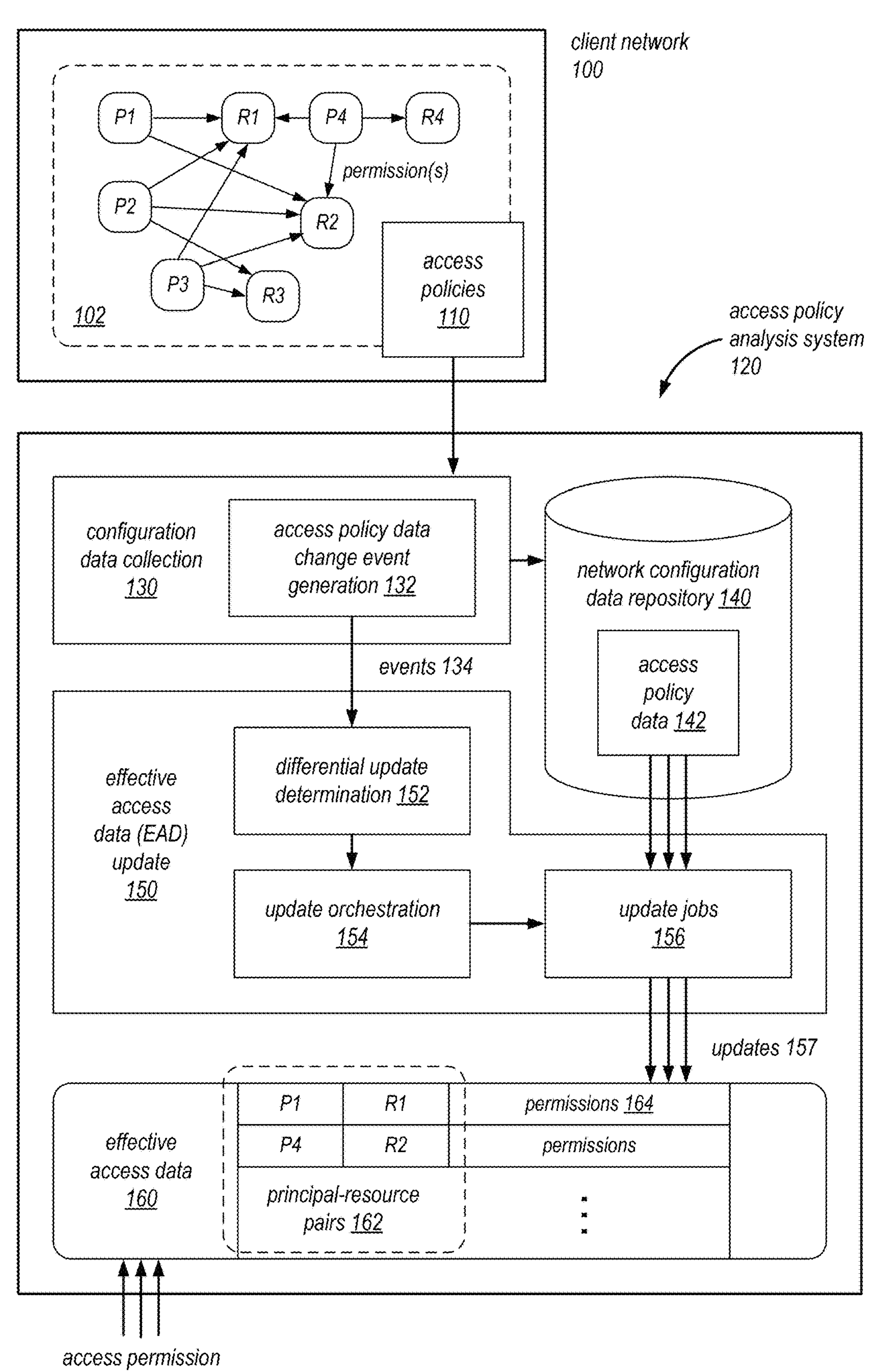
FIG. 1 is a block diagram illustrating an access policy analysis system that uses a differential update process to refresh effective access data based on access policy data of a computer network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various techniques are described herein to implement a differential update process for effective access data (EAD) generated from access policy data defined in a client network to enable EAD for a large number of principals and resources to be kept up to date in a relatively quick process that does not execute on portions of the EAD that are not impacted by recent access policy changes, and without using excessive amounts of compute resources.

Different cloud providers allow users to specify or manage the relationships between different entities that can take actions with respect to resources hosted in a cloud service provider. For example, these relationships may include a hierarchy that relates one or more entities to another entity higher in the hierarchy. A principal may be one example of an entity that could relate to other entities such as a group of principals associated with a same account, and a group of accounts associated with a same organization. These or other relationships between entities may allow users of cloud providers to determine the allowed or denied actions of entities both with respect to particular entities and resources (e.g., by attaching or otherwise associating access policies that define the allowed actions to entities and resources) and through the relationships of entities with other entities (which may also have associated access policies). The ability of an entity to perform a respective action may thus depend upon a number of different variables (e.g., directly through associated access policies and the access policies associated with related entities and resources). Therefore, it can be extremely difficult to correctly determine the effective access permissions of a particular entity with respect to a particular resource without actually attempting or simulating access on the particular resource. Additionally, it is virtually impossible to gain a complete view of the state of access permissions in the entire client network, so that misconfigured access policies can go undetected.

While a brute force access analysis technique may be implemented, the computational time and costs for identifying and calculating the access results for a given entity and resource according to these different variables can quickly become prohibitive (e.g., causing processing times with an impractical wait time for results on the part of analysis users or amounts of computing resources that would have to be used in order to provide a timely analysis result). Moreover, the growing reliance on cloud service providers in terms of numbers of resources hosted and entities taking actions with respect to those resources makes efficient access analysis techniques highly desirable.

In various embodiments, an access policy analysis system may be implemented to reduce the access policy data in a network into effective access data (EAD) that indicates the effective access permissions for individual pairs of principals and resources. In some embodiments, the EAD may include stored policy summaries that may be used for efficient querying to reduce the computational complexity and costs of providing access analysis, without sacrificing the accuracy of results. The EAD may be maintained in a cache for all principal-resource pairs in a client network, so that queries regarding the effective access permissions can be serviced extremely quickly without having to perform a detailed analysis of the access policies at the time of query. In this way, the results of the effective access analysis can be provided to implement and maintain well-designed access controls when using cloud service providers. Previous embodiments of the access policy analysis system are described in co-pending patent applications U.S. patent application Ser. Nos. 17/543,599 and 17/669,146, which are hereby incorporated by references herein.

In some settings, maintaining cached EAD for a large client network can become extremely burdensome. As the principals, resources, and access permissions in the network changes, the cached EAD needs to be constantly updated. However, for a large network with thousands of principals and millions of resources, a rebuild of the EAD can take a long time (e.g. over 24 hours), which means that the EAD could lag the actual state of the access permissions in the network by a large margin. This problem grows exponentially worse as the size and complicity of the network increases.

To address these issues, embodiments of the access policy analysis system are disclosed to perform a differential update of the EAD, where only certain portions of the EAD impacted by recent access policies are processed and updated. Other portions of the EAD that are not impacted by recent changes are not processed by the differential update process. In this manner, the update process will take a relatively short amount of time and require a small amount of computing resources, since the rate of access policy changes in even larger networks is typically slow. In some embodiments, the update process may also update the EAD for principals and resources that satisfy a staleness limit (e.g. principals and resources that have not reevaluated for a specified period of time). The differential update process may be repeated periodically or triggered by detected changes in the network, so as to keep the EAD at a desired level of freshness (e.g. reflecting all network changes older than a few hours).

In some embodiment, access policy data changes in the client network are detected as events generated by a data collection or harvesting process that collects a variety of configuration information from the network. The update process may be implemented as multiple asynchronous jobs, including an event consumer job that examines the events and flags portions of the EAD to be updated in one or more status tables, a worker dispatcher job that checks the status tables for flagged portions and divides the portions into independently updatable chunks, and a fleet of update jobs that updates the individual EAD chunks in parallel. In some embodiments, each update job may update an EAD chunk in a differential manner without rewriting the entire chunk. The differential chunk update is more efficient than a full chunk rewrite, which can needlessly rewrite unchanged records in the chunk and cause unnecessary index or hierarchical metadata rebuilds in the EAD data store.

In some embodiments, the update process may be managed via a management interface that allows users to view, control, and configure the update process, and examine various metrics data associated with previous executions of the update process. The management interface may provide user control elements that allow users to launch, stop, or schedule executions of the update process on selected portions of the EAD.

As will be appreciated by those skilled in the art, the disclosed differential update techniques for effective access data improve the functioning of computer systems that implement access policy analysis, to reduce the amount of time and resources needed to maintain EAD for large computer networks, keep the EAD at a high level of freshness, and allow users to easily monitor and manage update executions. The disclosed features represent practical applications that provide real-world benefits in real-world systems and processes, and are not intended to capture bare mental processes, pure mathematical concepts or formula, methods of organizing human activity, fundamental economic practices, or other types of abstract subject matter not eligible for patenting. These and other features and benefits of the differential update techniques are described in further detail below in connection with the figures.

FIG. 1 is a block diagram illustrating an access policy analysis system that uses a differential update process to refresh effective access data based on access policy data of a computer network, according to some embodiments.

As shown, FIG. 1 depicts a client network 100 that is being analyzed by an access policy analysis system 120. The client network 100 may be a computer network operated by a company or organization, and the access policy analysis system 120 may be operated by a different company or organization, for example, a service provider company that is contracted to monitor the client network for security vulnerabilities, compliance violations, configuration errors, anomalies, or signs of cyberattacks.

In some embodiments, the access policy analysis system 120 may be remote from the client network 100, and the system 120 may collect data about the client network for the analysis over a wide area network (WAN) or a public network such as the Internet. In some embodiments, the client network 100 may be a virtual network of virtual machines or other virtualized compute resources hosted by a cloud service provider network. Examples of cloud service providers include AMAZON WEB SERVICES (AWS), MICROSOFT AZURE, GOOGLE CLOUD, and the like. In some embodiments, the access policy analysis system 120 may be implemented as a virtual network in the same cloud service provider network, or even the same data center, as the client network 100. In some embodiments, the access policy analysis system 120 may be implemented within or as part of the client network 100.

As shown, the client network 100 is controlled by access policies 110, which define what types of actions that can be performed by actors in the network. For example, many types of identity and access management (IAM) systems implemented by cloud service providers use access policies to define access permissions. In some embodiments, a set of the access policies 120 may be defined for an account, which corresponds to a group of related users and account resources. Principals are actors in the account, such as users and roles, that can perform action(s) on a resource, such as a compute instance or a storage repository. For example, an access policy may indicate that a principal P1 has permission to perform certain actions on a resource R1, for example, to read, write, or change permissions on the resource R1. Access policies may be attached to or associated with a principal or a resource. In some embodiments, a principal may itself be considered a resource that may be acted upon (e.g. a user who can be granted permissions by a more privileged user). In some embodiments, an account may be attached with an access policy, and the account may be considered both a principal and a resource. In some embodiments, multiple accounts may be grouped as a set of related accounts, for example, belonging to a single organization unit. The set of related accounts may be considered a principal or resource and have its own access policies. In some embodiments, the access policies 110 may also be considered resources.

As shown, the collection of access policies 110 in the client network creates a set of effective access permissions 102 between principals (e.g. P1, P2, P3, and P4) and resources (e.g. R1, R2, R3, and R4) in the network. However, these effective permissions 102 are not stored in a form that is readily usable by users and applications outside the access control system. While the access policies 110 are interpretable and enforceable by the access control system (e.g. IAM system) of the client network, the effective access permissions 102 are not stored in a form that can be easily queried or used to perform other types of analysis. To enable efficient querying of these effective access permissions 102 created by the access policies 110, the access policy analysis system 120 implements functionality to reduce the access policy data into effective access data (EAD) 160, which indicates pair-wise access permissions 164 between individual pairs 162 of principals and resources, which are more easily usable to service access permission queries 170 and perform other types of access permission analysis. In some embodiments, the access permissions 164 may indicate a set of Boolean (yes/no) values for different types of access actions (e.g. read, write, configuration actions), to indicate whether each access action is allowed from the principal to the resource.

In some embodiments, the EAD 160 may be stored as table data in a table, such as a Structured Query Language (SQL) table. Each record or row of the table may include the principal ID and resource ID of the principal-resource pair 162. The principal ID and resource ID may be part of the primary key of the table, and indexed for fast searching. The permissions attributes 164 may indicate whether the principal is permitted to perform certain actions (e.g. read, write, tag, permission, list) on the resource. In some embodiments, the actions may also include an "unknown" action that can correspond to a special type of action that does not fall within any category in the action list. In some embodiments, the EAD 160 may be cached in volatile memory, for example, by a distributed in-memory cluster such as a REDIS cluster.

As shown, in some embodiments, the access policy analysis system 120 implements a configuration data collection subsystem 130, which is responsible for collecting different types of configuration data, including access policy data 142, from the client network 110. This collection may be performed periodically so that the system 120 is able to continuously monitor the configuration of the network. In some embodiments, the collection may be performed using collection agents executing in the client network. The collected configuration data is stored in a network configuration data repository 140, as shown.

In some embodiments, the configuration data collector 130 may be programmatically extended to perform specific types of specialized tasks, such as to generate 132 events that indicate changes in the access policy data 142. The event generation 132 may be based on an initial examination of the collected access policy data 142. For example, a change event 134 may be generated if it is detected that a user or role is created or deleted, a resource is created or deleted, or an access policy is attached, detached, or modified. The change event 134 may be used to trigger or control the scope of the differential EAD update process.

The EAD updater system 150 is configured to update the EAD in a differential fashion (e.g. partially and/or periodically based on policy data changes), so that each execution of the update process can be completed relatively quickly and without using excessive amounts of computing resources. The differential update approach is highly efficient in this setting because changes to access policy data occur infrequently in most computer networks. The differential update process may be performed on a regular, event-driven, or scheduled basis, so that the EAD 160 is kept up to date to satisfy a configured freshness requirement.

As shown, the EAD updater 150 in this example is implemented using a differential update determination component 152, an update orchestration component 154, and an update job component 156. In some embodiments, these components or tasks may be merged into common components or separate into additional components. In some embodiments, components 152, 154, and 156 may be executed as asynchronous execution jobs. Each execution job may run continuously, periodically, or be triggered by events.

In some embodiments, the differential update determination component 152 consumes the policy data change events 134 and examines the events to determine which portions of the EAD 160 to update. As discussed, this determination will exclude certain portions of the EAD from being processed by the update process, so that only affected portions of the EAD will be processed. In some embodiments, data in the EAD 160 may be organized into individual organization units or client entities, accounts, principals, and/or resources. The differential update determination component 152 may identify portions that correspond to individual organization units or client entities, accounts, principals, and/or resources. In some embodiments, the granularity of the update process may be configurable via a configuration interface. The configuration interface may allow users to specify filters to expressly exclude or include certain portions of the EAD in the update process. In some embodiments, the differential update determination component 152 may record its determinations in as persistent data (e.g. as files or status tables in a database) that can be read by the update orchestration component 154.

In some embodiments, the update orchestration component 154 is configured to wake up periodically and check the persistent data written by the differential update determination component 152 for portions of the EAD that needs to be updated. The execution frequency of the update orchestration component 154 may be configured via a configuration interface (e.g. hourly, daily, or weekly), based on the preferences of an administrator.

In some embodiments, update orchestration component 154 will take each portion of the EAD identified by the differential update determination component 152 and further divide the portion into EAD chunks of approximately equal size, so that each chunk can be updated by an individual update job 156. Depending on the embodiment, each chunk may correspond to a particular account, principal (or group of principals), or resource (or group of resources). In some embodiments, the EAD 160 may be stored as rows in a table (e.g. one or more SQL tables) that include unique identifiers (e.g. primary keys or partition keys). The orchestration component 154 may divide the chunks so that each chunk corresponds to a group of records that span a continuous range of row identifiers.

In some embodiments, the update orchestration component 154 may directly launch the update jobs 156 and specifically assign individual chunks to the individual update jobs 156. In other embodiments, the update orchestration component 154 may instead add the chunks to a work queue to be retrieved by individual update jobs 156. In some embodiments, the update orchestration component 154 may perform a scheduling function to scheduling a chunk to be updated at a later time or within a later time range. The manner that the chunks are scheduled may be controlled by user-specified configuration settings and/or resource constraints within the EAD update subsystem 150. For example, in some embodiments, where the update process is performed periodically, the update orchestration component 154 may elect to postpone or delay the update of some chunks to a next update period (e.g. the next day) if the number of update jobs reaches a maximum limit, or if resources within the EAD update subsystem 150 are saturated.

In some embodiments, the update jobs 156 may be implemented as independently executing processes that can execute concurrently on the EAD 160. Individual jobs may be implemented as separate threads or processes executing in a common execution environment, or execute on separate compute resources (e.g. separate virtual machines or containers). As shown, the update jobs 156 will read the access policy data 142 in the collected data repository 140 and evaluate the access policy data to determine how the EAD 160 should be updated. In some embodiments, the update jobs 156 will update 157 the EAD 160 by interacting with a database that stores the EAD through the database's read/write interface. The update jobs 156 may update its chunk of the EAD in a differential manner within the chunk, for example, by not updating records in the chunk that are not changed by the access policy data changes. This approach is more efficient than rewriting the entire chunk because it avoids needless rebuilding of indexing data and/or other hierarchical data associated with the chunk.

In some embodiments, the update jobs 156 may output job execution data, which can be used to track and manage the differential update process. The job execution data may include the progress data of the update job, any errors countered, termination conditions of the update job, etc. In some embodiments, the update job may also write a timestamp data in the EAD tables or internal status tables maintained by the update subsystem 150. These timestamps may be used by the system to calculate a staleness metric for different portions of the EAD, which may be used to determine whether an EAD portion should be updated. Additionally, the update job may update the status code of the updated EAD portion(s) in the status tables to indicate that the portion(s) are now updated.

Figure 2:
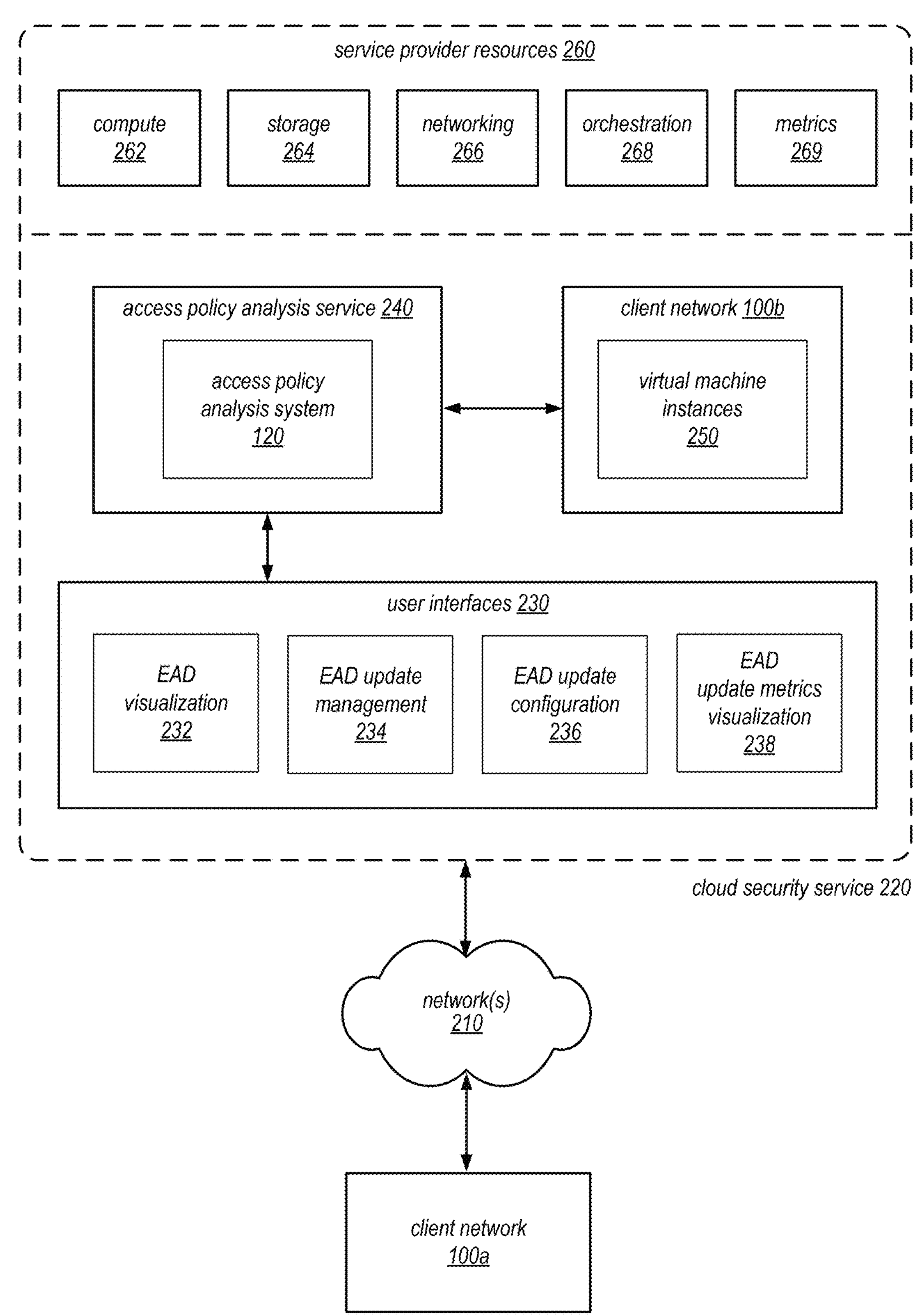
FIG. 2 is a block diagram illustrating a cloud security service that implements an access policy analysis service that uses the differential update process to update EAD for cloud provider entities, according to some embodiments.

FIG. 2 is a block diagram illustrating a cloud security service that implements an access policy analysis service that uses the differential update process to update EAD for cloud provider entities, according to some embodiments.

As shown in the figure, a cloud security service 220 is implemented using resources 260 provided by a cloud-based service provider. The cloud-based service provider may be a software-as-a-service (SaaS) provider, a platform-as-a-service (PaaS) provider, or an infrastructure-as-a-service (IaaS) provider. Examples of cloud-based service providers include AMAZON WEB SERVICES (AWS), MICROSOFT AZURE, GOOGLE CLOUD. The cloud security service 220 is implemented as a cloud-based application in the service provider network to provide cloud-based client-facing cloud security services 220 to various clients. Client(s) 100 may be operated by different groups, organizations, companies, or other types of entities that are customers of the cloud security service 220. In some embodiments, different clients may be associated with different user accounts of the cloud security service 220.

As shown, the cloud service provider network may include different types of compute 262, storage 264, networking 266, orchestration 268, and metrics 269 resources. The cloud service provider network may also provide other types of infrastructure services not shown here. Aspects of the cloud security service 220 may be built on top of the infrastructure provided by these resource services. For example, computing resources may include different virtual machines that are an instance of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. Similar techniques may be implemented to host other computing, storage, networking, orchestration, or other resources. For example, instances may be database instances that host a database system or a data storage instance that hosts a virtual disk or other storage device. As discussed, access to these computing resources by various entities of the respective cloud service providers may be allowed or denied according to specified access policies, which may be created and enforced by an IAM system of the cloud service provider network.

As shown, the cloud security service 220 may execute to assess and monitor various client networks, such as client networks 100*a* and 100*b*. In this example, client network 100*a* is implemented outside the cloud service provider network, for example, as a physical network located at a client premises. On the other hand, client network 100*b* is a virtual network hosted within the cloud service provider network and includes a network of virtual machines instances 250 and other virtualized resources.

Client(s) 100 may enable, disable, execute, or otherwise configure, through user interface(s) 230, various security services 220, on behalf of different resources hosted in a cloud provider service. For example, access policy analysis service 240 may provide effective access analysis for access policies of a client network. Other cloud security service(s) 220 may include, but not limited to, visibility and monitoring services to maintain an accurate inventory of different cloud provider resources, automate and provide real-time remediation security controls and tools, risk assessment and auditing of resources in a cloud provider service, threat detection, resource configuration change monitoring, code security and compliance, among other cloud security services.

In various embodiments, the network(s) 210 may encompass any suitable combination of networking hardware and protocols necessary to establish communications between the client(s) 100 and the cloud security service 220. In some embodiments, client(s) 110 may execute in a private network of a company, behind a company firewall, and the network 210 may include a public network such as the Internet, which lies outside the firewall. The network 210 may encompass the different telecommunications networks and service providers that collectively implement the Internet. In some embodiments, the network 210 may also include private networks such as private local area networks (LANs), private wide area networks (WANs), or private wireless networks. The network 325 may be implemented using different hardware (e.g., modems, routers, switches, load balancers, proxy servers, etc.) and software (e.g., protocol stacks, accounting software, firewall/security software, etc.) for establishing networking links between client(s) 110 and the cloud security service 220.

As shown, the cloud security service 220 may implement access policy analysis service 240, which includes an embodiment of the access policy analysis system 120 of FIG. 1. Access policy analysis service 240 may implement policy set ingestion, which may proactively obtain an access policy set by reading from a specified storage location for access policy set or by obtaining access credentials to obtain access to the set of access policies in the cloud service provider. In some embodiments, policy set ingestion may receive access policy set as part of an interface implemented by cloud security service.

Access policy analysis service 240 may store a copy of the access policy set, in some embodiments, in a policy set storage. For example, policy set ingestion may access (or create) a storage location corresponding to an account of cloud security service 220 associated with policy set to store the policy set. In some embodiments, policy set ingestion may check for subsequent updates to the access policy set (e.g., by polling for updates). In some embodiments, policy set ingestion may receive and then store updates to the policy set.

In some embodiments, access policy analysis service 240 may implement policy summary generation to generate, prior to any analysis request, at least a portion of a tree structure for policy summaries. For example, policy summary generation may access the various policies, entities, and resources specified in policy set to create or update a tree structure in a policy summary storage (e.g. in repository 140 of FIG. 1). The policy summaries may be created according to different entities including links, branches, or other paths between entities that indicate relationships between entities, which may then be later traversed as part of performing an access analysis. In some embodiments, tree structure of policy summaries may be incrementally updated as new access policies are obtained and added to policy set.

Access policy analysis service 240 may evaluate the access policy data 142 to generate effective access data 160 in response to user requests. For example, a request, such as policy analysis request may be received via the EAD visualization interface 232, which may specify an entity (e.g., a principal by a principal identifier) and one or more resources (e.g., by resource identifier) for which effective access data is to be generated. In some embodiments, the EAD visualization interface 232 may be configured to receive access permission queries 170, as discussed in connection with FIG. 1.

Access policy analysis service 240 may implement policy set storage (e.g. using the repository 140 of FIG. 1). The policy set storage may be an object, file, database, or other data storage system that can store set of access policies that are to be considered when performing an access policy analysis for a user. Policy set storage may, for example, index different sets of policies tied to different accounts of cloud security service 220 (e.g., according to an account identifier) so that when ingestion or access analysis is performed on behalf of a user associated with the account, the correct policy set is accessed and used. Moreover, policy set storage may implement various security or other controls for restricting access to policy sets to perform authorized analyses (e.g., only a user of an account can access that account's set of access policies and not another user of another access account).

As shown, the cloud security service 220 may also implement a set of user interfaces 230, including the EAD visualization interface 232, the EAD update management interface 234, the EAT update configuration interface 236, and the EAD update metrics visualization interface 238. These interfaces may be implemented as web-based interfaces that are accessible via a web browser. The user interfaces 230 may be a graphical or command line user interface. In some embodiments, the user interfaces 230 may also include real-time notification interfaces such as email or text interfaces. In some embodiments, the user interfaces 230 may be implemented as part of a user console to allow users to configure various aspects of the cloud security service 220, receive assessments reports, and carry out remediation actions.

Figure 3:
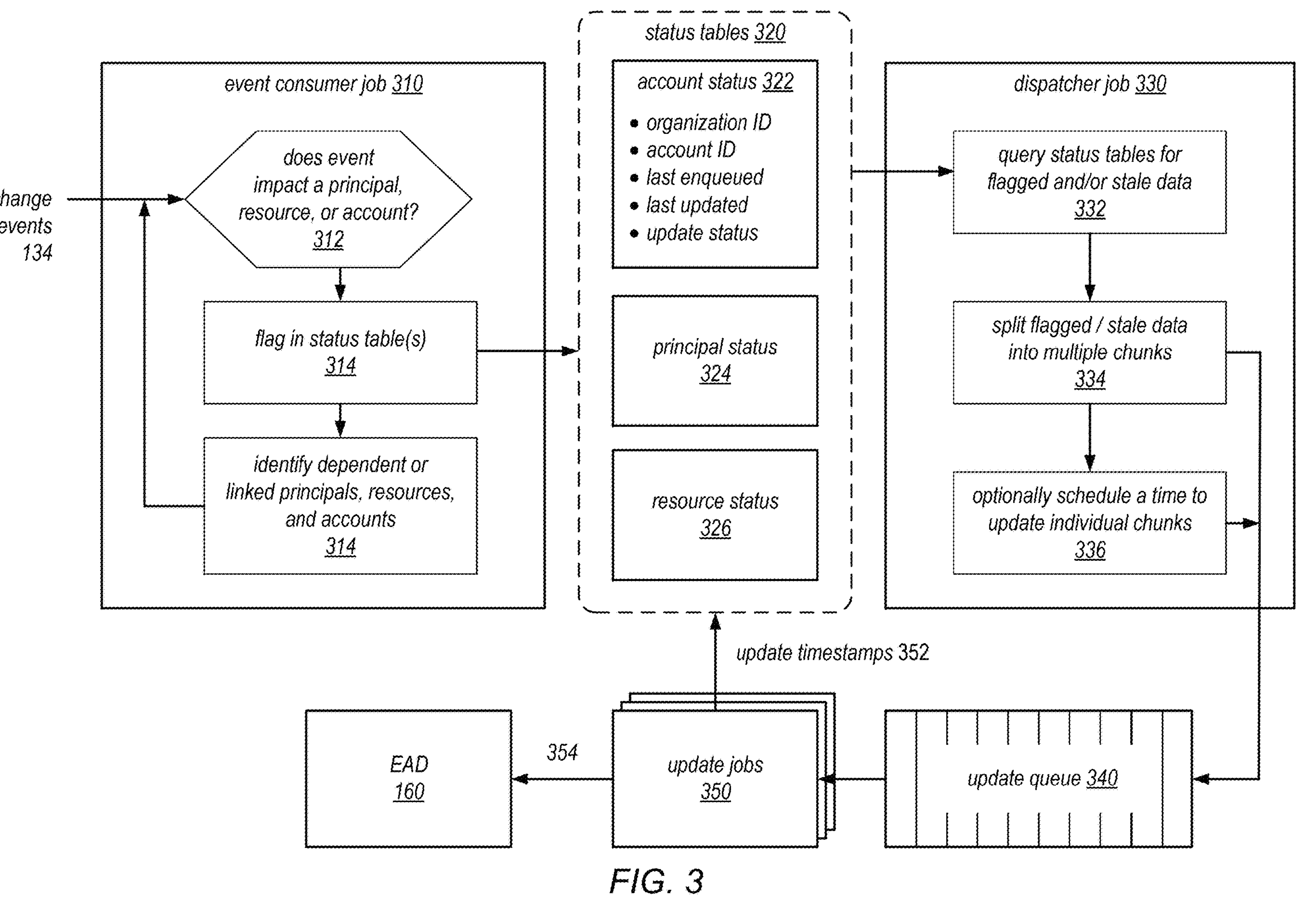
FIG. 3 illustrates operations of the differential update process implemented using a set of asynchronous jobs, according to some embodiments.

FIG. 3 illustrates operations of the differential update process implemented using a set of asynchronous jobs, according to some embodiments. The jobs 310, 330, and 350 shown in the figure may be executed by an embodiment of the access policy analysis system 120 of FIG. 1.

In some embodiments, the event consumer job 310 is tasked with consuming change events 134 generated from the collected access policy data. The event consumer job 310 may be executed by the differential update determination component 152 of FIG. 1. Change events 134 may indicate events such as the creation or deletion of a principal or resource, or changes to an access control policy associated with the principal or resource. In some embodiments, change events 134 may indicate the creation, deletion, or change in the access policies of an account. In some embodiments, another type of change event may be generated if the software code (or software version) that implements the EAD evaluation is changed, or if certain EAD calculation configuration settings are changed. In some embodiments, the types of change events that are generated or monitored by the event consumer job 310 can be configurable. For example, the event consumer job 310 may be configured to ignore certain types of events or events associated with certain principals or resources.

In some embodiments, the event consumer job will monitor all incoming change events 134 and check 312 to see if an event impacts a principal, resource, or account within its update scope. If the event impacts an item with the update scope, the item will be flagged 314 in one or more status tables 320 to indicate that EAD associated with the item should be updated. In some embodiments, each individual principal, resource, or account may be considered an individually updatable portion of the EAD. In some embodiments, principals and resources that belong to the same account may be grouped together into a single updatable portion.

As shown, in some embodiments, an additional step 314 may be taken to identify any dependent or linked principals, resources, and/or accounts associated with a flagged item. These dependent or linked principals, resources, or accounts are checked 312 again by the event consumer job 310 and flagged for updating as necessary. As shown, this process may recur until there are no more impacted items that can be identified. In some embodiments, the type of dependencies or links checked by step 314 may be configurable by the user.

The following table shows different types of change events recognized by one embodiment of the access policy analysis system 120 and the update actions that are taken in response to the events.

| Event | Update Action |
|---|---|
| Principal created | Calculate EAD for new principal against all resources in the same account |
| Principal destroyed | Delete EAD for the destroyed principal |
| Principal policy updated (e.g. attached, inline, trust) | Recalculate EAD for principal against all resources in the same account |
| Resource created | Calculate EAD for new resource against all principals in the same account |
| Resource destroyed | Delete EAD for the destroyed resource |
| Resource policy updated (e.g. attached, permission boundary changed) | Recalculate EAD for resource against all principals in the same account |
| Account access policy set changed | Recalculate EAD for all principals and resources contained in the account |
| Organization unit access policy set or hierarchy changed | Recalculate EAD for all principals and resources contained in all accounts in the organization unit's changed subtree |

As shown in the figure, in some embodiments, the status tables 320 may include an account status table 322, a principal status table 324, and a resource status table 326. Each status table may include a set of attributes used as unique record identifiers within the table. For example, the account status table 322 in this example uses an organization ID and an account ID as the unique identifier. The account status table 322 also includes a last enqueued attribute that indicates when an account is enqueued for updating, a last updated attributes that indicates when the account was last updated, and an update status attribute, which in this example represents the flag that will be flipped by the event consumer job 310 to indicate that the account needs to be updated. The update status attribute may be limited to a set of status code values (e.g. "enqueued," "change_detected," "not_computed") to indicate the current status of the account in the update process. For example, the event consumer job 310 will write a value of "change_detected" for an account to indicate the account should be updated.

The principal status table 324 and resource status table 326 will have a similar set of attributes as the account status table 322, including a unique row identifier, a last enqueued attribute, a last updated attribute, and an update status attribute. In some embodiments, the update status attribute of the status tables 320 is indexed for faster searching, to enable records that have been flagged for update to be quickly identified.

In some embodiments, the dispatch job 330 may be executed by the update orchestration component 154 of FIG. 1. As shown, the dispatch job 330 will query 332 the status tables 220 for portions of the EAD that have been flagged for updating. Additionally, in some embodiments, the dispatch job 330 may also determine from the status tables 220 any stale portions of the EAD that meets a staleness threshold, which will also be included in the update. Stale EAD portions may be determined based on the last updated attribute in the status tables 320 and a configured staleness threshold.

At operation 334, the flagged portions of the EAD may be reduced or further divided into multiple chunks, to be updated by a number of concurrently executed update jobs 350. In some embodiments, the EAD 160 is stored in a table where each row or record correspond to a unique principal-resource pair, and each chunk will include a different set of principal-resource pairs (e.g. pair that belong to a particular key range). In some embodiments, each chunk contains EAD for only one account.

In some embodiments, the dispatcher job 330 may explicitly assign each chunk to an instance of an update job 350. In some embodiments, the chunks may be placed into an update queue 340 and be retrieved by the update jobs 350 in a first-in-first-out (FIFO) order. In some embodiments, the dispatch job 330 may schedule a particular chunk update for a specific time or time range. Such scheduling may be made based on configuration data, the size or characteristics of the chunk, and/or resource utilization levels of the system. In some embodiments where the differential update process is configured to execute in periodic update windows, the dispatch job 330 may postpone some of the chunks to be updated in a next update window (i.e. throttle a portion of the update). Such a throttling may occur if there are insufficient resources in the system to fully perform the update in the current update window. In some embodiments, when a chunk update fails, the dispatcher job 330 may be configured to retry that chunk update in a later update window, optionally after a wait period to allow any transient errors to resolve.

As shown, the update jobs 350, which may be the same as update jobs 156 of FIG. 1, are tasked with the actual recalculation and updating 354 of individual EAD chunks. In some embodiments, if a set of update jobs 350 for a particular portion completes successfully, the last updated timestamp in the status tables 320 will be updated to reflect the time when the update jobs completed. The update jobs 350 may also update the update status attribute in the status tables 320 to indicate that the particular position has now been updated. In some embodiments, if the update jobs failed to update one or more chunks, the error condition may be written to the status tables so that the dispatcher job 330 can retry the chunk update at a later time. In some embodiments, a last updated time may also be stored in the EAD 160, for example, as a timestamp attribute of individual EAD records.

Figure 4:
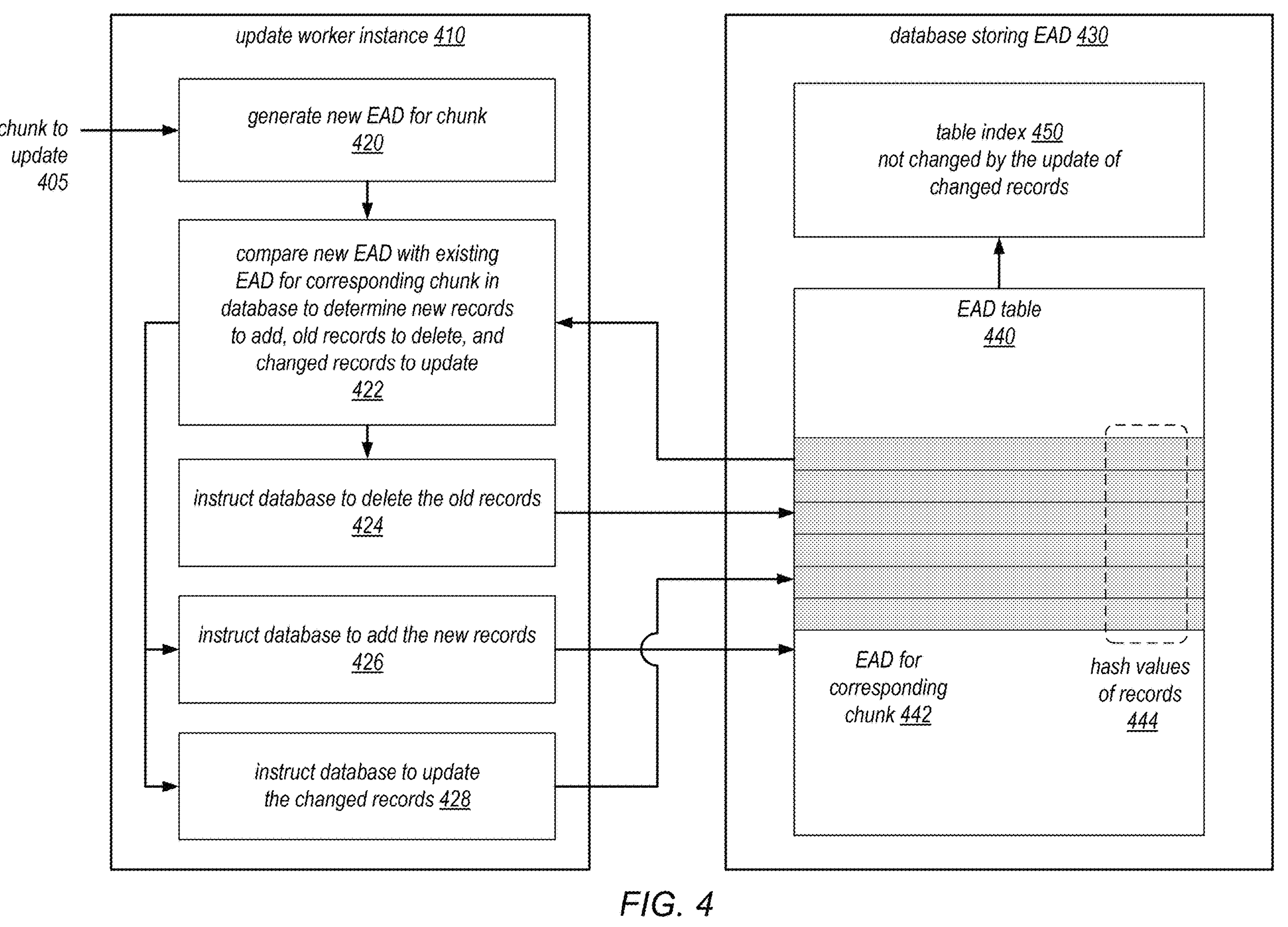
FIG. 4 illustrates a chunk update process used by the differential update process to avoid rewriting an entire chunk of data in an EAD table, according to some embodiments.

FIG. 4 illustrates a chunk update process used by the differential update process to avoid rewriting an entire chunk of data in an EAD table, according to some embodiments. The depicted process may be implemented by the update jobs 156 of FIG. 1 or update jobs 350 of FIG. 3.

As shown in this example, an update worker instance 410 is used to carry out an update job on a chunk 405 of the EAD. The EAD in this case is stored in a database 430 that stores the EAD in a table 440. The table 440 is indexed by a table index 450, which is built based on a primary key of the table (e.g. principal ID and resource ID of the table rows).

As shown, the update process begins at operation 420, where new EAD for the chunk is generated. The new EAD may be generated based on an evaluation of the access policy data 142 stored in the configuration data repository 140 of the client network.

Next, a comparison 422 is made between the newly generated EAD and the existing EAD 442 for the corresponding chunk in the database. The comparison is made to determine the difference between the newly generated EAD and the existing EAD, including any new records that need to be added to the existing chunk 442, old records that need to be deleted from the existing chunk 442, and changed records that need to be updated in the existing chunk 442.

Next, the update worker instance sends instructions to the database (e.g. as SQL statements) to update the existing chunk 442 accordingly. The database is instructed to add the new records 426, delete the old records 424, and update the changed records 428. Note that these instructions do not cause the database to rewrite the existing chunk 442 entirely, but only change a small number of records in the existing chunk. By doing the update in this differential manner, the database does not need to completely rebuild the table index 450 or any hierarchical metadata associated with the chunk, which could cause significant contention in the database when many update jobs are updating the table at the same time. In particular, updated records in the chunk that retain their primary key values will not require any changes to the table index 450.

As shown, in some embodiments, each record in the EAD table 440 may store an attribute that contains the hash value 444 of the record. These hash values 444 may be compared to new hash values computed from the new EAD during the comparison operation 422 to identify the records that need to be updated. By comparing hash values instead of actual record data, the comparison operation 442 may be performed more quickly and using less memory.

Figure 5:
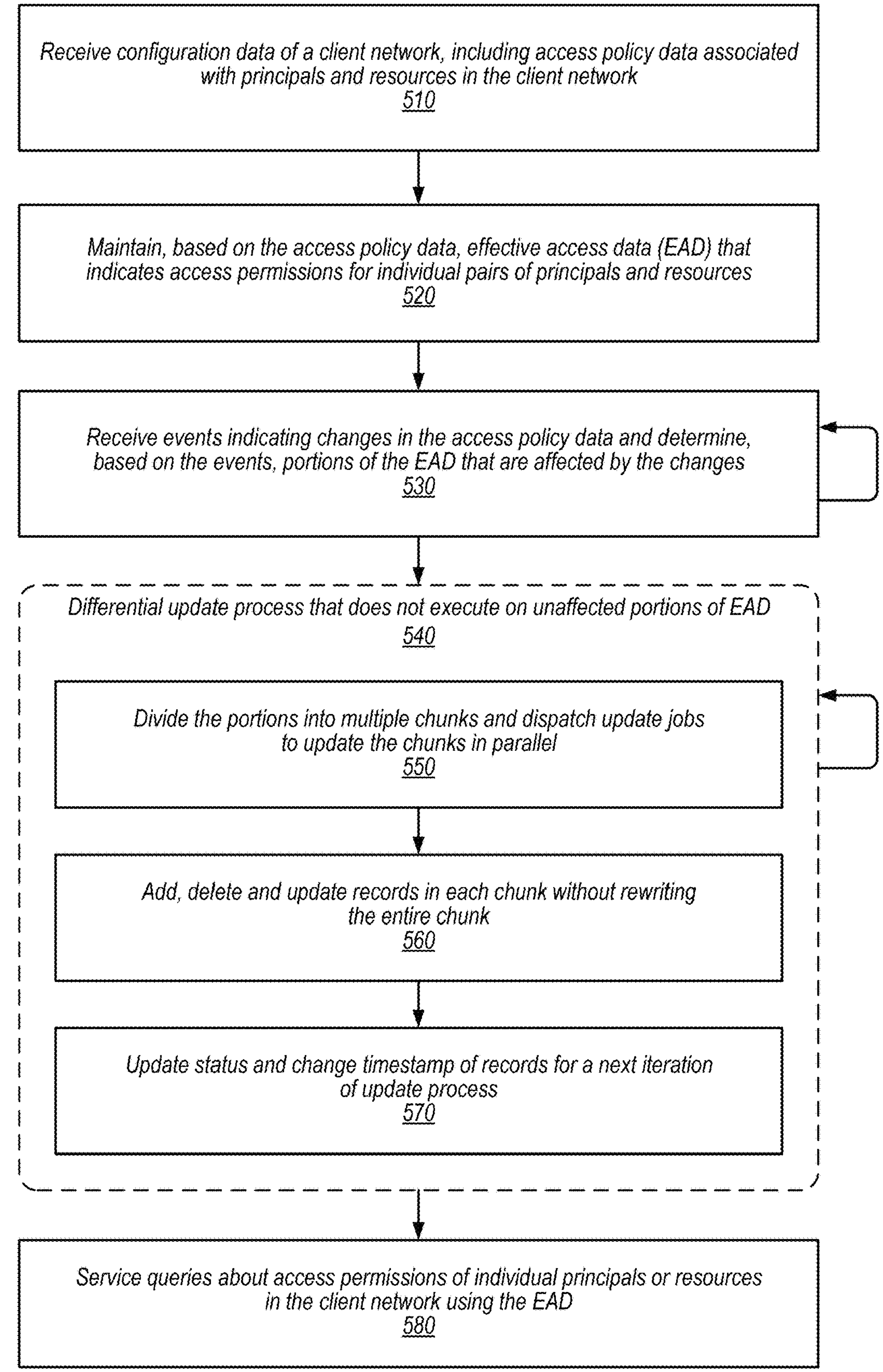
FIG. 5 is a flowchart illustrating the differential update process performed by the access policy analysis service, according to some embodiments.

FIG. 5 is a flowchart illustrating the differential update process performed by the access policy analysis service, according to some embodiments. The depicted process may be performed by an embodiment of the access policy analysis system 120 of FIG. 1.

The process begins at operation 510, where configuration data of a client network (e.g. client network 100) is received. The configuration data includes access policy data (e.g. access policy data 142) associated with principals and resources in the client network. In some embodiments, the configuration data may be collected periodically (e.g. using the configuration data collection component 130) and stored in a network configuration data repository (e.g. repository 140). The collected data may be analyzed to monitor the client network for security vulnerabilities, policy violations, and anomalies, etc.

At operation 520, the system maintains, based on the access policy data, effective access data (e.g. EAD 160) that indicates effective access permissions (e.g. permissions 164) for individual pairs of principals and resources in the network (e.g. pairs 162). The EAD 160 is stored and/or cached in a format that allows other systems to query and easily analyze the pair-wise effective permissions in the network. In some embodiments, the EAD 160 may be initially build for all principal-resource pairs in the network, and then subsequently updated in repeated differential updates as the access policy data in the network changes.

At operation 530, the system receives events (e.g. events 134) indicating changes in the access policy data. The changes may include the creation or deletion of principals, resources, and policies in the network, attachment/detachments of policies, or changes in the contents of policies. In some embodiments, the changes may also include changes in the relationship (e.g. trust relationships) between various principals, accounts, and organization units in the client networks. In response to the change events, the system (e.g. the differential update determination component 152) determines select portions of the EAD that are affected by the changes. The portions (e.g. individual principals, resources, or accounts) are flagged so that they will be process by the differential update process 540. In some embodiments, portions of the EAD that are not affected by the change events, as determined by operation 530, are not flagged or processed by the update process. As shown, operation 530 may be performed repeatedly (e.g. as an event consumer job 310) to periodically flag portions of the EAD that need to be updated.

As shown, operations 550, 560, and 570 are performed as part of the differential update process 540, which may also be repeated on its own schedule (e.g. at a configured frequency). At operation 550, the flagged portions of the EAD are reduced or further divided into chunks, and update jobs (e.g. update jobs 350) are dispatched to update each of the chunks in the EAD in parallel. In some embodiments, each chunk may correspond to a particular range of principal-resource pairs. Operation 550 may be performed by the update orchestration component 154 of FIG. 1, and as the dispatch job 330 of FIG. 3.

Operation 560 may be performed by individual update jobs 350 of FIG. 3, and in the manner described in connection with FIG. 4. At operation 560, an update job determines the difference between a newly generated EAD chunk and the corresponding existing EAD chunk, including any new records to be added, old records to be deleted, and changed records to be updated. The update job then sends instructions to the database storing the EAD to add, delete, and update the affected records. The instructions to update the EAD chunk does not rewrite the entire chunk, so that most of indexing metadata or hierarchical metadata associated with the chunk are not changed.

At operation 570, the update job updates status and/or change timestamps for a next iteration of the update process, which may be repeated at a next update window. In some embodiments, update timestamps may be written in the status tables controlling portions of the EAD to be updated. In some embodiments, update timestamps may be written in individual records in the EAD. The update timestamps may be used to determine a staleness of an EAD portion or a EAD record to determine whether an update should be performed. Additionally, the timestamps may be used to calculate a staleness or freshness metric of the EAD that can be viewed by administrators of the system.

At operation 580, with the EAD being maintained described, the system uses the EAD to service queries about access permissions (e.g. queries 170) in the client network. These queries may be used to enable a user interface to display effective access permissions in the network, or by other analytic applications to analyze the permissions for other purposes (e.g. to check for access control violations).

Figure 6:
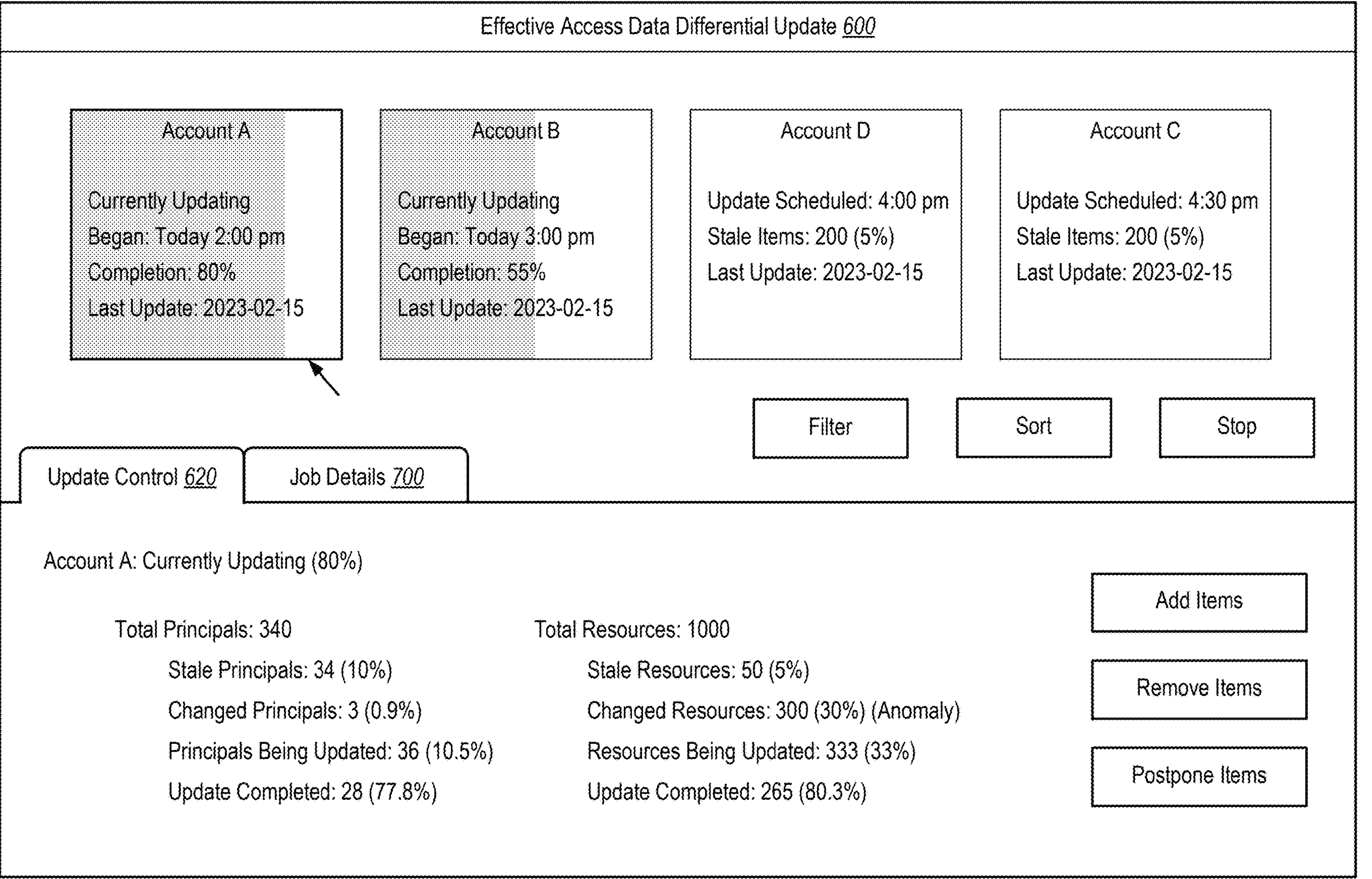
FIG. 6 depicts a user interface for monitoring and controlling a differential update process performed by the access policy analysis service, according to some embodiments.

FIG. 6 depicts a user interface for monitoring and controlling a differential update process performed by the access policy analysis service, according to some embodiments. User interface 600 may be an embodiment of the EAD update management interface 234 of FIG. 2.

As shown, the management interface 600 shows the progress of and status of the differential update process for individual accounts, including accounts A, B, C, and D. In other embodiments, the management interface 600 may be configured show this information based on other entity groupings (e.g. by organization units). As shown in this example, the differential update process is currently executing for accounts A and B, and a percentage completion measure is presented for these two accounts. Accounts C and D are not currently being updated, and the interface shows a staleness metric for these two accounts and when the update process is scheduled to begin for the two accounts.

As shown, the management interface 600 also provides user control elements (here buttons) to filter and sort the accounts being displayed based on the displayed account metrics. The management interface may also provide user control elements to start, stop, pause, resume, or schedule an update process for an account.

As shown, the bottom of the management interface 600 includes two tabs. Tab 620 displays various update metrics for a selected account (here account A). These update metrics include the number of principals and/or resources included in the update process, and the number and/or percentage of principals and/or resources that have already been updated by the update process. Depending on the embodiment, the displayed metrics may also include account metrics such as the total number of principals and/or resources in the account, the number or percentage of principals or resources in the account that need to be updated, and the number or percentage of principals or resources in the account that has been updated.

Additionally, in this example, the management interface 600 provides buttons to add and remove items (principals and resources) from a currently executing (or scheduled) update process. These adjustments to the update process may be used to adjust the behavior of the differential update determination component 152 so that the update scope of an update run can be controlled manually. The management interface 600 also provides a button to postpone the update of particular items (e.g. to schedule a particular time or time range to update one or more principals or resources), which will adjust the behavior of update orchestration component 154.

Figure 7:
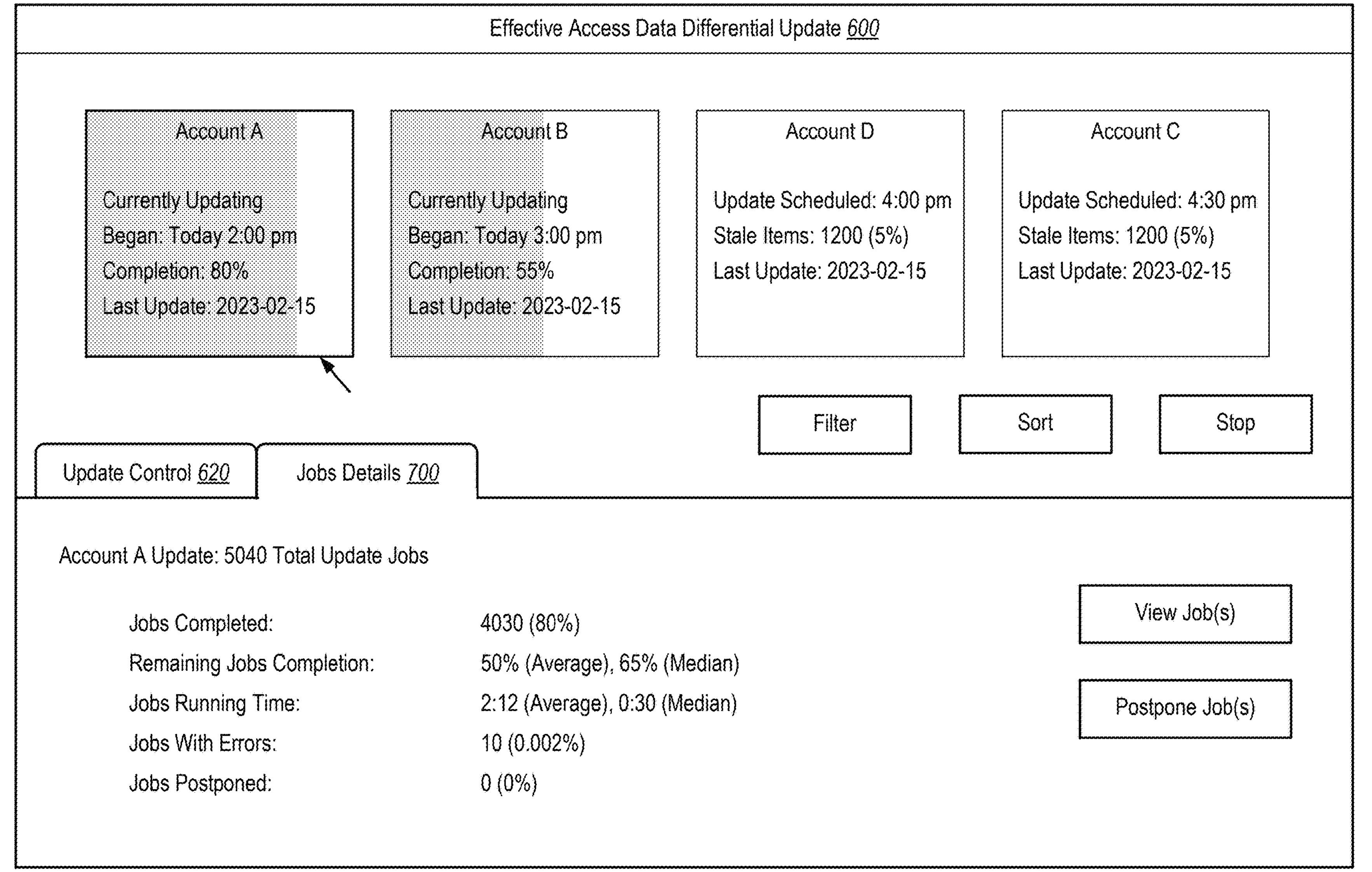
FIG. 7 depicts a user interface for monitoring and controlling individual update jobs in a differential update process performed by the access policy analysis service, according to some embodiments.

FIG. 7 depicts a user interface for monitoring and controlling individual update jobs in a differential update process performed by the access policy analysis service, according to some embodiments. As shown, the depicted interface is implemented on the job details tab 700 on the management interface 600 of FIG. 6.

As shown, the job details 700 allows the user to view various metrics about currently executing update jobs in the update process for account A. Depending on the embodiment, these job metrics may include the average or median running time of the update jobs, the average or median completion percentage of the update jobs, the number of update jobs that have completed, the number of update jobs that are postponed to a later update time window, and/or the number of errors generated by the update jobs. In some embodiments, the management interface may permit the update jobs to be viewed individually (e.g. using the view job(s) button), and show job metrics of each update job individually. Additionally, the management interface may provide user controls to start, stop, pause, resume, or postpone individual update jobs.

FIG. 8 depicts a user interface for configuring a differential update process to be performed by the access policy analysis service, according to some embodiments. The depicted configuration interface 800 may be an embodiment of EAD update configuration interface 236 of FIG. 2.

As shown, the top portion of the configuration interface 800 display a listing of accounts, and provides user control elements (here buttons) to add and remove differential EAD update processes to each of the accounts. In this example, accounts A and B have been configured with differential EAD update processes. Accounts C and D do not have configured EAD processes, but the EAD of these two accounts may be updated manually via the management interface 600.

The bottom portions of the configuration interface 800 shows a variety of configuration settings or parameters 810 that can be adjusted by the user to control various operational aspects of the update process. In some embodiments, the configuration parameters may include an execution frequency of the update process (e.g. daily or weekly). Depending on the embodiment, this frequency may be specified for individual accounts or individual EAD portions (e.g. for a particular principal or resource).

In some embodiments, the configuration interface 800 allows users to specify filters that exclude certain types updates from the scope of the update process. As shown in this example, the update process for account will not update the EAD for changes associated principal P1 and event types E2, E3, and E6. In some embodiments, a filter may be conditional so that it only takes affect when a specified condition is satisfied.

In some embodiments, the configuration interface 800 allows users to specify how update jobs in the update process should be delayed, postponed, or throttled. The throttling may be configured to occur when a throttling condition is met. The throttling condition may be based on a maximum number of update jobs or the amount of computing resources required by the update jobs. In this example, the input/output per second (IOPS) measure of the EAD repository is monitored, and when this measured is observed to exceed the specified limit, the throttling condition is met and the system will begin to throttle update jobs. In some embodiments, the update system may be configured to distinguish certain portions of the update process has being higher priority than other portions, so that lower priority portions of the update are throttled first.

In some embodiments, the update process will update not just portions of the EAD impacted by access policy changes, but also certain stale portions of the EAD that meets a configured staleness condition based on a staleness metric. The configuration interface 800 allows users to specify the staleness condition and/or metric. As shown in this example, a principal is considered stale when it has not been recalculated or reevaluated after 10 days, while a resource is considered stale when it has not been recalculated or reevaluated after 12 days. In some embodiments, the staleness metric and/or limit may be specified for individual principals or resources.

In some embodiments, the update process may support retrying of failed updates (e.g. of particular EAD portions or chunks). Failed updates may occur due to certain erros in the collected access policy data. The configuration interface 800 may enable users to configure parameters associated with the update retries. In this example, updates of EAD for account A will be retried up to a maximum of three times. This retry limit prevents certain types of errors from causing continuous updates in the update process. Additionally, the configuration parameters indicates a wait period or cooling period before attempting the retry. This wait period is specified to allow any transient errors in the collected access policy data to self-resolve before a retry is attempted.

Figure 9:
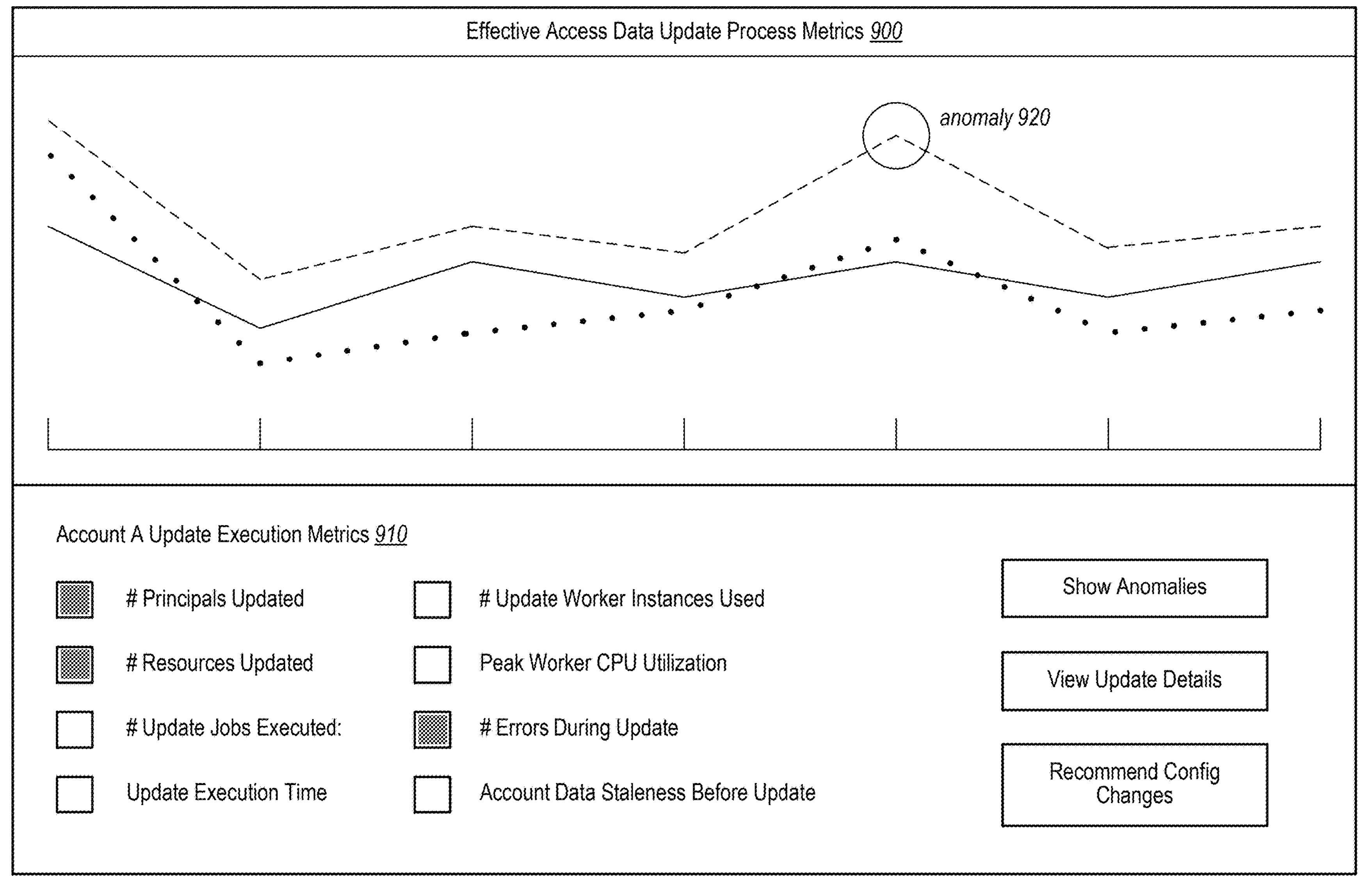
FIG. 9 depicts a user interface for displaying metrics data associated with previous executions of a differential update process, according to some embodiments.

FIG. 9 depicts a user interface for displaying metrics data associated with previous executions of a differential update process, according to some embodiments. The metrics interface 900 may be an embodiment of the EAD update metrics visualization interface 238 of FIG. 2.

As shown, the metrics interface 900 is configured to display metrics data for previous executions of a configured differential update process (here for account A). In this example, the metrics data is shown as time graph over a selectable time range. Type types of metrics data shown in the time graph are selectable via checkboxes in the bottom portion 910 of the metrics interface.

As shown, the bottom portion of the metrics interface lists a number of execution metrics that are tracked by the system. This metrics data may be generated during the execution of each iteration of the update process, and logged to a persistent data store. Depending on the embodiment, tracked metrics data may include the number of principals or resources that were updated and an execution time of the update process, the number of update jobs executed during the update process, the amount of computing resources used by the update process (e.g. a peak CPU utilization rate), the amount of errors encountered during the update process, and a freshness or staleness metric for portions of the EAD before or after the update process.

In some embodiments, the system may be configured to detect anomalies 920 in the execution metrics and indicate the anomaly on the metrics interface 900. The anomalies may be identified based on statistical methods and/or machine learning models configured via the configuration interface 800. As shown, embodiments of the metrics interface 900 may provide user controls to allow the user to view details of detected anomalies and individual iterations of the update process. As shown, in some embodiments, the metrics interface 900 may also recommend certain configuration changes to the update process based on the metrics data. For example, the system may recommend to increase the frequency of EAD updates if the observed staleness of the EAD is repeatedly reaching high levels. In some embodiments, the recommendation may be generated by machine learning models that are trained based on actual user input.

Figure 10:
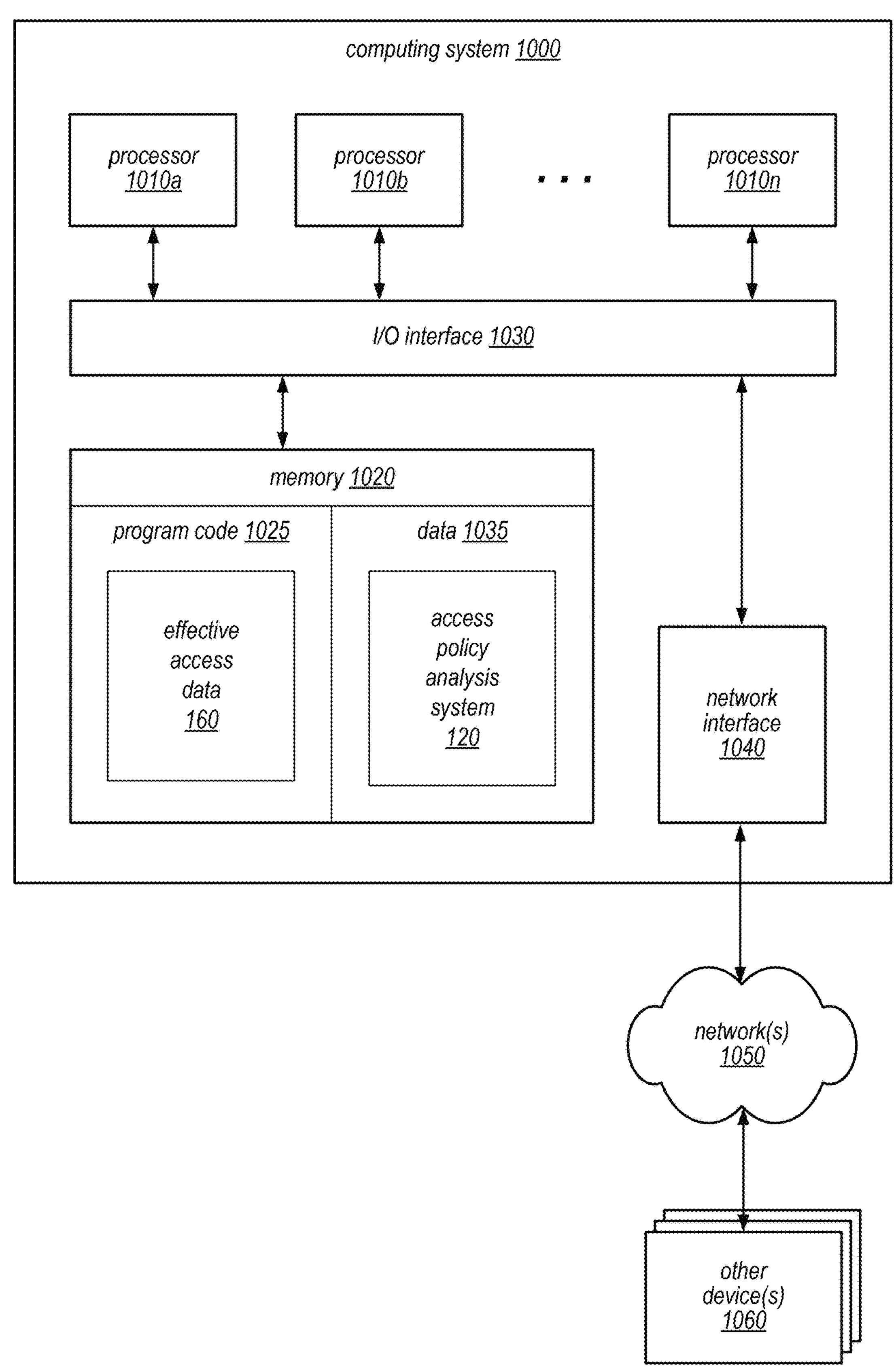
FIG. 10 is a block diagram illustrating an example computer system that can be used to implement one or more portions of the access policy analysis system, according to some embodiments.

FIG. 10 is a block diagram illustrating an example computer system that can be used to implement one or more portions of the access policy analysis system, according to some embodiments. For example, the computer system 1000 may be a server that implements one or more components of the access policy analysis system 120 of FIG. 1. In some embodiments, the computer system 1000 may be used to implement one or more components of the cloud security service 220 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the access policy analysis system 120, as discussed. The system memory 1020 may also be used to store data 1026 needed or produced by the executable instructions. For example, the in-memory data 1026 may include portions of effective access data 160, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:

one or more computing devices configured to implement an access policy analysis system, configured to:

generate, based on access policy data collected from a client network, effective access data (EAD) that indicates access permissions for individual pairs of principals and resources in the client network;

generate a configuration interface and receive via the configuration interface configuration parameters that control behavior of an update process to update portions of the EAD affected by ongoing changes in the access policy data, wherein the configuration parameters specify:

(a) which principals or resources to include or exclude from the update process, (b) an execution frequency of the update process, and (c) a wait period to perform retries when the update process detects errors in the access policy data;

periodically receive events indicating changes in the access policy data;

periodically execute the update process according to the execution frequency to update portions of the EAD affected by the changes indicated by events, wherein the update process is not executed on other portions of the EAD not affected by the changes, wherein the update process includes a plurality of update jobs executed asynchronously and in parallel;

in response to detection of an error in the access policy data, schedule a retry of the update process on a portion of the EAD, wherein the retry is scheduled after the wait period to wait for the error to resolve in a next collection of the access policy data;

generate a graphical user interface (GUI) that displays information about the update process including:

(a) a number of principals or resources included in the update process, and (b) a number or percentage of the principals or resources that have been updated or not yet been updated by the update process;

continuously and programmatically monitor the EAD for one or more security conditions in the client network including access control violations, misconfigurations, compliance violations, or anomalies;

detect the one or more security conditions in the client network based on the EAD; and programmatically execute one or more remediation actions to mitigate one or more security risks caused by the detected one or more security conditions.

2. The system of claim 1, wherein:

the access policy data is collected for a plurality of accounts; and the GUI is configured to display status of the update progress for individual ones of the accounts.

3. The system of claim 2, wherein:

the GUI is configured to display one or more metrics of individual ones of the accounts, including one or more of:

(a) a total number of principals or resources in an account, (b) a number or percentage of principals or resources in the account that need to be updated, and (c) a number or percentage of principals or resources in the account that has been updated, the GUI is configured to sort the accounts based on the one or more metrics.

4. The system of claim 1, wherein the GUI includes a user control element to schedule a time or time range to update one or more principals or resources in the EAD.

5. The system of claim 1, wherein:

the GUI is configured to display one or more metrics of the update jobs, including one or more of:

(a) an average or median running time of the update jobs, (b) an average or median completion percentage of the update jobs, (c) a number of update jobs that have completed, (d) a number of update jobs that are postponed to a later update time window, and (e) a number of errors generated by the update jobs.

6. The system of claim 1, wherein the EAD is stored as a set of Boolean values for different types of access actions, in one or more tables that are part of a Structured Query Language (SQL) database.

7. The system of claim 1, wherein the configuration parameters specify different execution frequencies of the update process for different accounts.

8. The system of claim 1, wherein the configuration parameters specify a filter for (a) principals or resources that are included in the update process, or (b) type of change events that are monitored by the update process.

9. The system of claim 1, wherein:

the access policy analysis system is configured to throttle some of the update jobs when a throttling condition is reached based on a number of update jobs or an amount of computing resources required by the update jobs; and the configuration parameters specify the throttling condition.

10. The system of claim 1, wherein:

the access policy analysis system is configured to perform the update process on a portion of the EAD when a staleness metric of the portion exceeds a threshold; and the configuration parameters specify the staleness metric and the threshold.

11. The system of claim 1, wherein:

the configuration parameters specify a maximum number of retry attempts in response to one or more types of detected errors.

12. The system of claim 1, wherein the access policy data is collected from an identity and access management (IAM) system of a cloud service provider.

13. A method comprising:

performing, by an access policy analysis system implemented by one or more computing devices:

generating, based on access policy data collected from a client network, effective access data (EAD) that indicates access permissions for individual pairs of principals and resources in the client network;

generating a configuration interface and receiving via the configuration interface configuration parameters that control behavior of an update process to update portions of the EAD affected by ongoing changes in the access policy data, wherein the configuration parameters specify:

(a) which principals or resources to include or exclude from the update process, (b) an execution frequency of the update process, and (c) a wait period to perform retries when the update process detects errors in the access policy data;

periodically receiving events indicating changes in the access policy data;

periodically executing the update process according to the execution frequency to update portions of the EAD affected by the changes indicated by events, wherein the update process is not executed on other portions of the EAD not affected by the changes, wherein the update process includes a plurality of update jobs executed asynchronously and in parallel;

in response to detection of an error in the access policy data, scheduling a retry of the update process on a portion of the EAD, wherein the retry is scheduled after the wait period to wait for the error to resolve in a next collection of the access policy data;

generating a graphical user interface (GUI) that displays information about the update process including:

(a) a number of principals or resources included in the update process, and (b) a number or percentage of the principals or resources that have been updated or not yet been updated by the update process;

continuously and programmatically monitoring the EAD for one or more security conditions in the client network including access control violations, misconfigurations, compliance violations, or anomalies;

detecting the one or more security conditions in the client network based on the EAD; and programmatically executing one or more remediation actions to mitigate one or more security risks caused by the detected one or more security conditions.

14. The method of claim 13, wherein:

the access policy data is collected for a plurality of accounts; and the GUI is configured to display status of the update progress for individual ones of the accounts.

15. The method of claim 14, wherein the GUI is configured to sort the accounts based on one or more metrics of the accounts, including one or more of:

(a) a total number of principals or resources in an account, (b) a number or percentage of principals or resources in the account that need to be updated, and (c) a number or percentage of principals or resources in the account that has been updated.

16. The method of claim 13, wherein the GUI includes a user control element to schedule a time or time range to update one or more principals or resources in the EAD.

17. The method of claim 13, further comprising the access policy analysis system:

generating an update metrics interface that displays metrics data of previous executions of the update process, including for each of the previous executions, a number of principals or resources that were updated and an execution time of the update process.

18. The method of claim 17, wherein the metrics data includes, for each previous execution of the update process, one or more of:

(a) a number of update jobs executed during the update process, (b) an amount of computing resources used by the update process, (c) an amount of errors encountered during the update process, and (d) a freshness or staleness metric of portions of the EAD before or after the update process.

19. The method of claim 17, wherein the GUI is configured to indicate anomalies detected in the metrics data.

20. One or more non-transitory computer-readable storage media storing instructions that, when executed on or across one or more processors, cause the one or more processors to implement an access policy analysis system, configured to:

generate, based on access policy data collected from a client network, effective access data (EAD) that indicates access permissions for individual pairs of principals and resources in the client network;

generate a configuration interface and receive via the configuration interface configuration parameters that control behavior of an update process to update portions of the EAD affected by ongoing changes in the access policy data, wherein the configuration parameters specify:

(a) which principals or resources to include or exclude from the update process, (b) an execution frequency of the update process, and (c) a wait period to perform retries when the update process detects errors in the access policy data;

periodically receive events indicating changes in the access policy data;

periodically execute the update process according to the execution frequency to update portions of the EAD affected by the changes indicated by events, wherein the update process is not executed on other portions of the EAD not affected by the changes, wherein the update process includes a plurality of update jobs executed asynchronously and in parallel;

in response to detection of an error in the access policy data, schedule a retry of the update process on a portion of the EAD, wherein the retry is scheduled after the wait period to wait for the error to resolve in a next collection of the access policy data;

generate a graphical user interface (GUI) that displays information about the update process including:

(a) a number of principals or resources included in the update process, and (b) a number or percentage of the principals or resources that have been updated or not yet been updated by the update process;

continuously and programmatically monitor the EAD for one or more security conditions in the client network including access control violations, misconfigurations, compliance violations, or anomalies;

detect the one or more security conditions in the client network based on the EAD; and programmatically execute one or more remediation actions to mitigate one or more security risks caused by the detected one or more security conditions.

* * * * *